United States Patent Office 3,413,801
Patented Dec. 3, 1968

3,413,801
DEVICE FOR CONVERTING CALORIFIC ENERGY INTO MECHANICAL ENERGY
Roelf Jan Meijer and Roland Anton Johan Otto Van Witteveen, Emmasingel, Eindhoven, Netherlands, assignors to North American Philips Company, Inc., New York, N.Y., a corporation of Delaware
Filed May 5, 1967, Ser. No. 637,136
Claims priority, application Netherlands, May 11, 1966, 6606406
8 Claims. (Cl. 60—24)

ABSTRACT OF THE DISCLOSURE

A heat supply system for operating a heat engine and specifically a hot-gas engine, comprising a container of a molten metal fuel, a supply of an oxidizer connected by conduit to the fuel container, and a supply of a non-reactive gas connected to the fuel container through at least part of the supply conduit of the oxidizer thereby preventing backflow of the metal fuel to the supply conduit in the event of a dimnishing of the supply of oxidizer.

---

The invention relates to a device for converting calorific energy into mechanical energy, particularly a hot-gas engine, comprising one or more spaces of a lower average temperature in which a working medium can be compressed, as well as one or more spaces of a higher average temperature which communicate with the first-mentioned space and in which the working medium can be expanded, a heat exchanger, preferably a regenerator, being arranged in the communication between each pair of the said spaces, the said device further comprising a heater system for supplying heat to the working medium.

In known devices of the type to which the present invention relates, the heater system for supplying heat to the working medium consists of a burner device to which fuel and air for combustion are supplied. A drawback of this system is that the device can operate only if air for combustion is present in sufficient quantities. A further drawback of this known device is, in circumstances, the fact that combustion gases have to be conducted away. This may be particularly disadvantageous especially when using the device in question in mines. When the device in question is used in constructions for deep-sea research, the dissipation of the combustion gases can be realized only with very great difficulties and large power consumption, including the associated cost, as a result of the high pressure of the surrounding water.

In order to be able to use the devices of the type to which the present invention relates for the above fields of application all the same, it might be possible to use heat accumulators for supplying heat to the working medium. These are containers filled with a mass of material having a large heat capacity in which a quantity of heat can be stored which can be derived therefrom at any desired instant and be supplied to the working medium. A drawback of such heat accumulators is that the enthalpy per unit of volume is comparatively low which results in very bulky constructions, which is not admissible any longer in circumstances.

It is the object of the invention to obviate the above drawbacks and to provide a heater system which can supply heat to the working medium without being dependent upon the ambient circumstances and without the exhaust products having to be conducted away out of the system.

In order to realize this the device according to the invention is characterized in that the heater system comprises at least one first container having a metal or a mixture of metals which is liquid at the operating temperature of the working medium, the heater system further comprising at least one second container containing a medium which can react chemically with the liquid in the first container with evolution of heat in such manner that the reaction products are solid and/or liquid at the temperature and pressure prevailing in the first container, the second container communicating through a supply duct with the first container and the system further comprising a control device for the dosed supply of medium from the second container to the first container, whereas the device further comprises a third container having a medium which does not react chemically with the metal or mixture of metals in the first container and the medium added thereto from the second container, a duct communicating with said third container which communicates at its other end with the duct between the second and the first container, means being provided for supplying medium from the third container to the first container, the first container being provided with an outlet for medium from the third container.

So in the device according to the invention the two media which react with one another are stored in two separate containers so that, independently of the circumstances in which the device has to operate, heat can always be evolved by bringing the said reaction products together. In addition, the metals and the medium reacting chemically with the metals are chosen to be so that the reaction products are solid and/or liquid so that no gaseous reaction products have to be conducted away out of the system. It has been found that a heater system according to the invention can supply a quantity of heat which is many times larger per unit of volume than can be stored per unit of volume in known heat accumulators. Since the metals in the first container and the medium in the second container can react very strongly with one another, it might occur, when no measures had been taken, that the liquid metal enters the communication duct. Since said duct has a lower temperature outside the insulation, the metal therein will solidify which may present difficulties. These difficulties, according to the invention, are completely mitigated as a consequence of the third container being in communication with the said communication duct such that gas from the third container can flow to the first container. It is possible to supply a continuous flow of inert gas from the third container to the first container. When now the flow of medium from the second container is varied, there will always be a sufficient flow of medium in the communication duct in order to prevent the penetration of metal into said communication duct. As the danger of penetration of metal into the communication duct is greatest when the medium flow from the second container is discontinued, it is possible to control the gas flow from the third container in such manner that gas from the third container is supplied to the first container only at these instances when the flow of medium from the second container becomes too small to prevent penetration of metal into the communication duct.

The first container may contain one or more of the metals Li, Na, K, Mg, Al and/or one or more of the rare earth metals. These metals and especially combinations of the said metals have the advantage of being liquid already at comparatively low temperatures and evolving much heat per unit of volume during the reaction.

The medium in the second container may be oxygen, a halogen or a halogen-containing compound, particularly a carbon-halogen compound. Halogens or halogen-containing compounds, when reacted with the metal in the first container, produce a very good evolution of heat per unit of volume.

The medium supplied from the third container also fills a space present in the first container over the liquid metal or liquid mixture of metals whereas the discharge duct connected to this space may comprise a device for maintaining a certain pressure in the said space. The object of this is to compensate for small volume variations which may occur and to keep the liquid under a given pressure so that a stirring or pumping device present in the container can operate effectively.

According to a further embodiment the gas in the third container is a rare gas, for example, helium or argon, which does not react with the metals in the first container.

It is possible in circumstances that metal particles or metal vapour from the first container are conducted away with the medium from the third container which has flowed through the liquid bath. These metal particles and metal vapour respectively may cause difficulties if they reach points of lower temperature where they deposit in a solid form. In order to obviate said difficulty, a further embodiment of the device according to the invention is characterized in that in the outlet communicating with the first container for medium from the third container a device is provided for separating out any metal particles and metal vapour respectively carried along with the medium.

In a further embodiment the outlet communicating with the first container, for medium from the third container, comprises a duct communicating with the second container through which medium from said second container flows in the outlet, which medium reacts chemically with the metal particles and the metal vapour respectively. As a result of this, said metal particles are converted into substances which then can be received by another separating device. Alternatively it is possible to trap the liquid substances formed on certain surfaces and to return them to the liquid bath in the first container.

A further possibility of separating out metal particles or metal vapour carried along with the medium consists in providing in the outlet a substance which has a gettering action for the metal particles in question.

A further embodiment of the device according to the invention, which is constructed as a hot-gas engine the heater of which is constructed as a pipe-heater, is characterized in that the heater pipes are arranged in the first container and are bathed by the metal or mixture of metals present therein. In this manner a direct heat exchange is obtained between the working medium and the metal and mixture of metals respectively and reaction products.

In another embodiment of said device a circulation duct is provided in which a metal or a mixture of metals, for example, NaK, is circulating, the heater pipes of the motor being bathed by said liquid metal or mixture of metals and said metal or mixture of metals being in heat exchanging relationship at another point with the liquid in the first container. So in this device a larger freedom in arrangement and construction of the heater system and the device in question relative to one another is obtained in which the heat of the heater system is transported to the device by the metal in the further circulation duct.

A further embodiment of the device which comprises an expansion turbine the outlet of which for expanded medium communicates through a heat exchanger and a cooler with the inlet of a compression device and in which the outlet of the compression device communicates through the heat exchanger and a heater with the inlet of the turbine is characterized in that working medium of the device is a rare gas which does not react with the metals in question, for example, helium, in which the duct communicating with the outlet of the compression device debouches with its other end at a low point in the first container containing metal and a mixture of metals respectively, the outlet of said container communicating with the inlet of the expansion turbine, whereas the second container may communicate through a duct with the circuit through which the working medium flows at a point which, viewed in the direction of flow of the working medium, succeeds the cooler and particularly is provided at a point lying between the cooler and the inlet of the compression device. So in this case the working medium will be conducted directly through the liquid bath which ensures a very good heat-exchange. However, the outlet of the first container should comprise a separating device already mentioned above for checking the carrying off of metal particles or metal vapour by the helium. In this device, the working space of the device serves as the third container, so that the working medium itself prevents the penetration of metal into the supply duct for the medium from the second container.

In order that the invention may readily be carried into effect, a few devices for converting calorific energy into mechanical energy will now be described in greater detail, by way of example, with reference to the accompanying drawings, in which:

FIG. 1 diagrammatically shows not to scale a cross-sectional view of a device constructed as a hot-gas engine for converting calorific energy into mechanical energy in which a piston 2 and a displacer 3 reciprocate. The piston taining a liquid metal or liquid mixture of metals and a second container communcating therewith which contains a medium which chemically reacts with the substance in the first container, whereas a third container, comprising helium communicates with the duct between the first and second container.

Figure 1:
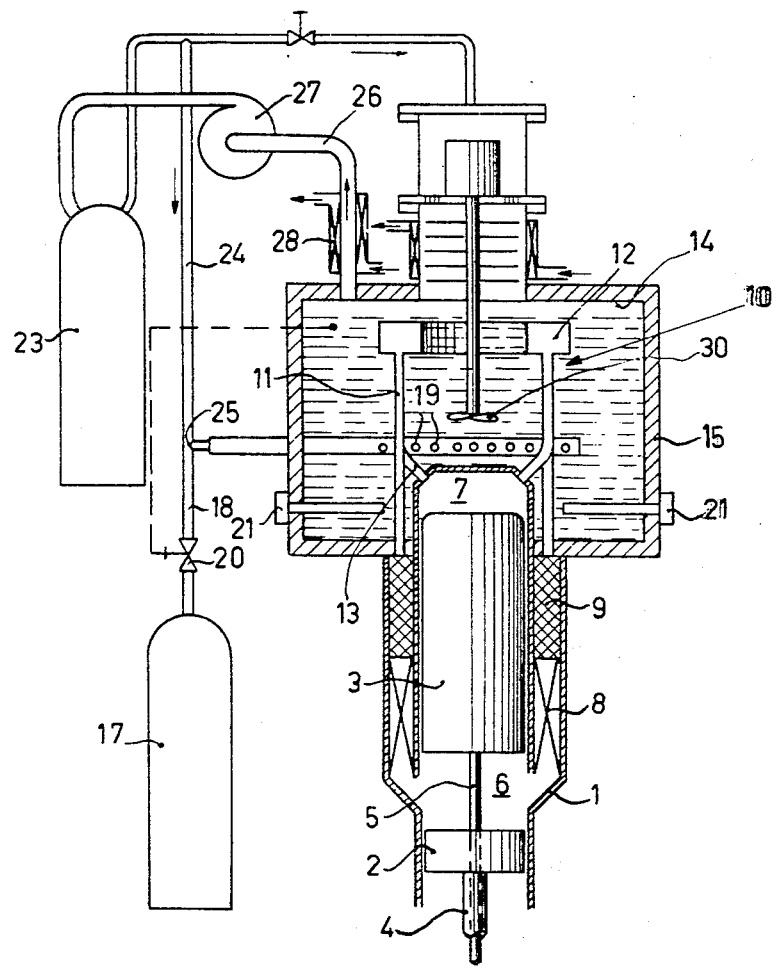

In FIG. 1 reference numeral 1 denotes a cylinder in which a piston 2 and a displacer 3 reciprocate. The piston 2 and the displacer 3 are connected to a driving mechanism (not shown) by a piston rod 4 and a displacer rod 5 in such manner that the piston and the displacer can move with a mutual phase difference. In operation the piston 2 together with the lower side of the displacer 3 varies the volume of a compression space 6 while the displacer varies the volume of an expansion space 7 with its top. The compression space 6 and the expansion space 7 communicate with one another through a cooler 8, a regenerator 9 and a heater 10. The heater 10 consists of a ring of pipes 11 which communicate at one end with a regenerator 9 and at the other end with an annular duct 12. The annular duct 12 communicates with the expansion space 7 through ducts 13 which are located between the pipes 11. The operation of the hot gas engine is assumed to be known. The pipes of the heater 10 are surrounded by a first container 15. This container contains a metal or a mixture of metals the melting point of which is such that at the desired operating temperature the metal or the mixture of metals is liquid. The device further comprises a second container 17 which contains a medium which reacts with the metals in the container 15 with evolution of heat. The container 17 communicates with the container 15 through a duct 18, including a control valve 20. The part of the duct 18 in the container 15 is provided with a number of holes 19 through which the medium from the container 17 is readily distributed in the container 15.

The metal in the container 15 may be, for example, Li, Na, K, Mg, Al or one of the rare earth metals or combinations thereof. The choice of the metals is substantially determined by their melting temperature and their evolution of heat.

The medium in the container 17 may be oxygen, a halogen or a halogen-containing compound. Particularly carbon-fluor compounds (Freons) can readily be used.

The heater system further comprises a third container 23 containing a medium, for example helium or argon, which reacts neither with the medium in the container 17 nor with the metal or mixture of metals and the reaction products formed in the container 15 respectively. The container 23 communicates through a duct 24 with a place 25 in the duct 18. The place 25 lies between the cock 20 and the orifice of the duct 18 in container 15. In the container 23 a pressure is maintained which is higher than the pressure in the container 15. The container 15 comprises an exhaust duct 26 which communicates through a circulation pump 27 with the container 23. A cooler 28 is incorporated in the exhaust duct 26. Over the liquid metal in container 15 a space 14 is present which is also filled with helium under pressure.

The operation of this heater system is as follows. In the containers 17 and 23 a pressure is maintained which is higher than the pressure in the container 15 which may be atmospheric. The metal in container 15 has first been brought at a temperature at which it is liquid by supplying heat through the electric heating devices 21. The medium from the two containers 17 and 23 collectively flows to the container 15. The medium from the container 17 will react with the liquid metal while the medium from the container 23 will flow without reaction with the liquid metal to the exhaust. In the cooler 28 this medium is cooled and then directed back to the container 23 by the pump 27. The advantage of this system is that on closing the cock 20 the metal cannot enter the duct 18. It would solidify therein because the duct is at a lower temperature and the device could not be started again.

If metal particles or metal vapour were carried along with the helium to the exhaust duct 26 this may give rise to difficulties because said metal particles and vapour respectively, reaching structural components at lower temperature, for example, the circulation pump 27, deposit on these components in a solid form. To prevent this a separator for said particles may be arranged in the exhaust duct. This separator is not shown but may be formed by a filter or by providing in the exhaust a material, for example, provided on a surface contacted by the flow, which has a gettering action for the metal particles so that these particles are caught. The receiving of metal particles and vapour respectively may also be effected on additionally cooled surfaces provided for this purpose.

Alternatively it is possible to communicate the exhaust with a supply of medium from the container 17. This medium will react with the metal particles and vapour respectively and form substances which can more easily be caught with filters. The remaining active medium supplied is then again conducted to container 15.

If the gaseous medium in the second container 17 is $C_4F_8$ and the metal in container 15 is lithium the reaction products are solid and consist of lithium fluoride and carbon particles. If the gaseous medium is, for example, $ClF_3$, the reaction products are solid lithium fluoride and liquid lithium chloride. This at a temperature of approximately 840° C. which is a suitable operating temperature for the hot-gas engine.

The solid particles which are formed during the reaction will form a mixture with the molten metal. The volume of the reaction product is approximately equal to that of the metal which has participated in the reaction. In this case no reaction products need be conducted away.

A ready heat transmission between the liquid metal and the heater pipes is ensured in that by convection currents and by the movement which is obtained by the in-flowing gaseous medium a ready contact of the pipes by the metal is obtained.

In the reaction between a metal or a mixture of metals and oxygen, a halogen or a halogen-containing compound, a quantity of heat is evolved per unit of volume of the reaction substances which is a number of times larger than the quantity of heat which can be stored in conventional heat accumulators per unit of volume. Hence a heater system in which a chemical reaction occurs can have a considerably smaller volume and a lower weight than the usual heat accumulator systems. The advantage that no gases of combustion need be conducted away is fully maintained. This is very important in relation to the pollution of air which forms a problem in large towns and mines. In addition, said chemical heater system may also be used in places where dissipation of gases of combustion is not readily possible as a result of high ambient pressure.

The device shown in FIG. 1 further comprises a stirrer 30 which brings the liquid metal in even better contact with tthe heater pipes. In order to prevent metal from depositing to the bearings, with which the stirrer is supported, a flow of helium is blown downwards along the shaft so that metal vapour cannot reach the colder parts.

Figure 2:
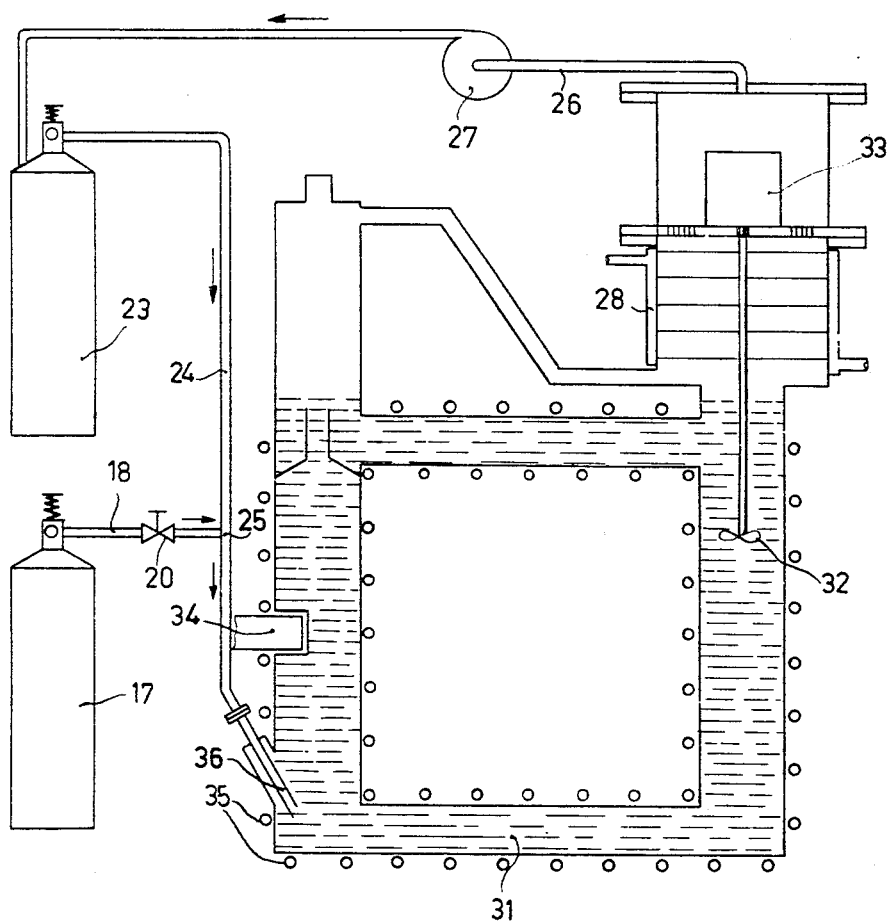
FIGS. 2 and 3 show two further embodiments of the device shown in FIG. 1 likewise diagrammatically and not to scale.

FIG. 2 shows a modified embodiment of the heater system. In this embodiment the container 15 is constructed as a circulation duct 31 in which a circulation pump 32 is arranged. In the example chosen, the circulation pump is driven by an electric motor 33 but it will be clear that the driving may also be effected through a transmission by the outgoing shaft of the hot-gas engine. The hot-gas engine 34 in this figure is shown diagrammatically since it is of no importance for the operation of the heater system. The further components, for example, containers 17 and 23 and ducts 18, 24 and 26 are again denoted by the same reference numerals as in the preceding figures. Heating spirals 35 are arranged around the circulation channel 31 to bring the system at the desired starting temperature.

It is of much importance in this device that the metal bath can always be kept under a sufficient pressure with the helium pressure to ensure a ready operation of the circulation pump. If a vacuum would be formed in the circulation duct the pumping action would be lost.

FIG. 3 again shows a hot-gas engine in which between the heater of the hot-gas engine and the container of the heater system a medium circulates which transports the heat which is evolved in the circulation duct 31 to the heater pipes. This transport medium is incorporated in a circulation system consisting of a chamber 40 located around the heater of the hot-gas engine, a duct 41, a circulation pump 42, a heat exchanger 43 and a duct 44 which again communicates with the chamber 40. This duct contains a metal or mixture of metals, for example, NaK. In the heat exchanger 43 this metal is in heat exchanging relationship with the liquid metal or mixture of metals in the circulation duct 31.

This construction has the advantage that in constructing the heater the properties of the liquid in the surrounding container varying during operation need not be taken into account. The properties of the liquid heat-transporting metal is not varied in the course of time.

For the construction of the heat exchangers 43 one has more freedom, because in this case one is not restricted to the requirements of the hot-gas engine so that there a heat exchanger may be constructed which cooperates readily with the liquid of the circulation duct 31.

Figure 4:
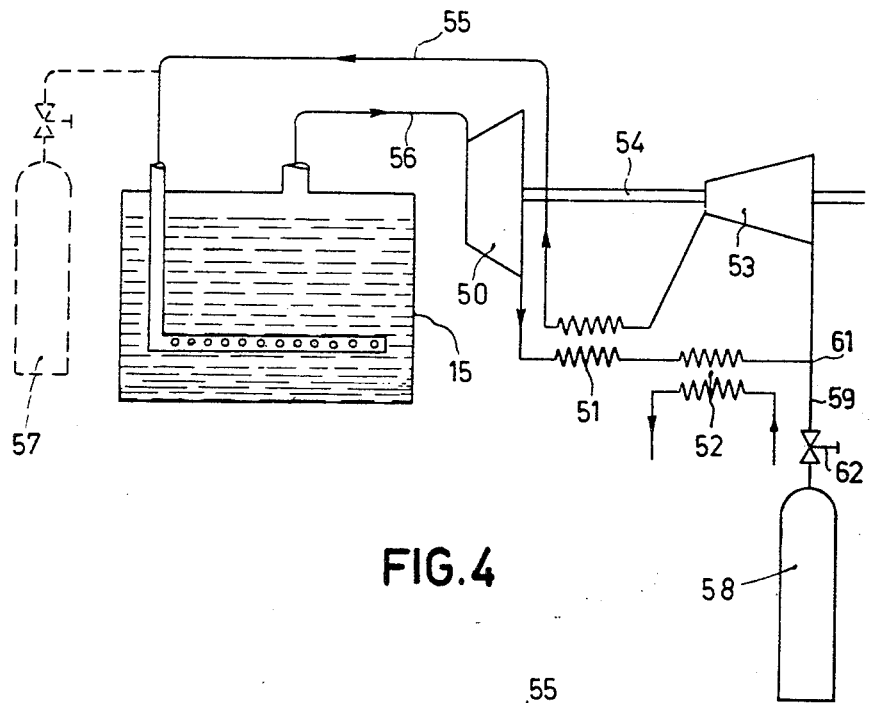
FIGS. 4 and 5 show diagrammatically and not to scale two embodiments of devices for converting mechanical energy into calorific energy in which a working medium flows through a closed cycle in which an expansion turbine and a compression device are included.

FIG. 4 shows another embodiment of a device for converting calorific energy into mechanical energy. This device comprises an expansion turbine 50, a heat exchanger 51, a cooler 52, a compressor 53 which is connected to the same shaft 54 as the expansion turbine 50.

The outlet of the compressor 53 passes through a duct 55 to the container 15. The container 15 comprises an outlet which communicates through the duct 56 with the inlet of the expansion turbine 50.

As was the case in the devices of the preceding figures the container 15 again contains a liquid metal or mixture of metals. The working medium which flows through the turbine and the compressor cycle is a rare gas, for example helium or argon, which does not react with the metals in question.

So in this device the working medium to be heated of the device is in direct contact with the metal and mixture of metals respectively and reaction products in the container 15, so that a good heat exchange is ensured.

It is possible that the medium flowing through the container 15 drags along metal particles and vapour respectively. To obviate this the same measures may be taken as described with reference to the device shown in FIG. 1.

The medium reacting with the metals in container 15 is stored in container 58. This container 58 communicates through a duct 59, in which a control valve 62 is arranged, with place 61 of the working medium circuit. This arrangement has the advantage that the working medium of the device transports the reacting medium to the container 15 so that no danger can exist that the metal enters into the supply duct of the reactive medium. The container comprising the medium reacting with the metals can eventually also be arranged as indicated at 57 with dotted lines. The arrangement 58 is to be preferred because at 61 the lowest pressure in the cycle prevails.

Figure 5:
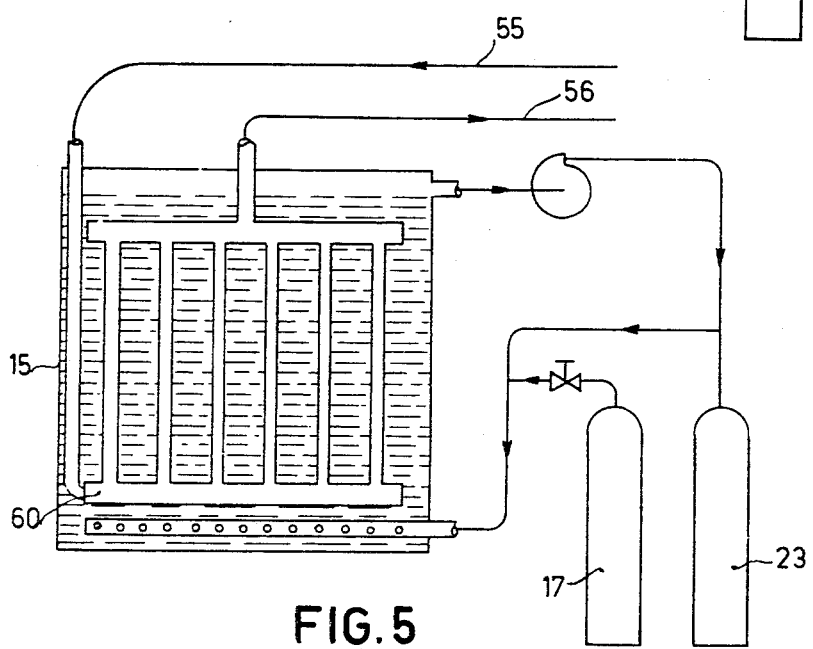

FIG. 5 shows another embodiment of the device shown in FIG. 4. In this embodiment the working medium is not contacted directly with the metal in the container 15 but a heat exchanger 60 is arranged in the container 15 which communicates at one end with the duct 55 and at the other end with the duct 56.

Figure 3:
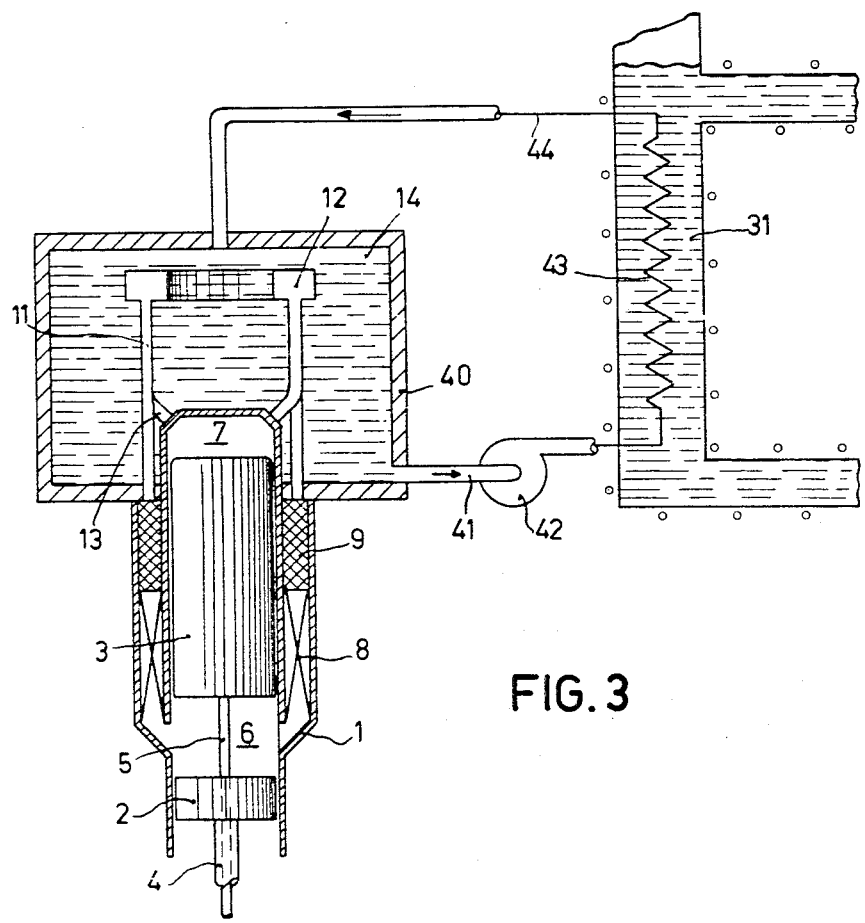

In these devices also the container 15 may be constructed again as a circulation duct as shown in FIG. 3.

In this device the medium from the container 17 is supplied to the container 15 again together with the helium from the container 23. An advantage of this construction is that the container 15 is not exposed to the pressure of the cycle.

It may be clear from the above that the invention provides a heater system in which a large enthalpy is associated with a comparatively small volume and which has the great advantage that no gaseous products of combustion need be conducted away.

What is claimed is:

1. A device for converting calorific energy into mechanical energy, particularly a hot-gas engine, comprising one or more spaces of a lower average temperature in which a working medium can be compressed, as well as one or more spaces of a higher average temperature communicating with the first-mentioned spaces in which the working medium can be expanded, a heat exchanger, preferably a regenerator, being arranged in the communication between each pair of those spaces, the said device further comprising a heater system for supplying heat to the working medium, characterized in that the heater system comprises at least one first container containing a metal or a mixture of metals which is liquid at the operating temperature of the working medium, the heater system further comprising at least one second container containing a medium which can react chemically with the liquid in the first container with evolution of heat in such manner that the reaction products are solid and/or liquid at the temperature and pressure prevailing in the first container, the second container communicating through a supply duct with the first container and the system further comprising a control device for the dosed supply of medium from the second container to the first container, whereas the device further comprises a third container containing a medium which does not react chemically with the metal or mixture of metals in the first container and the medium supplied thereto, said third container communicating with a duct which communicates at its other end with the duct between the second and the first container, means being provided for supplying medium from the third container to the first container and the first container being provided with an outlet for medium from the third container.

2. A device as claimed in claim 1, characterized in that the third container contains a rare gas, for example, helium or argon, which does not react with the metals in question.

3. A device as claimed in claim 1, characterized in that the outlet on the first container for medium from the third container communicates with the third container through a circulation pump.

4. A device as claimed in claim 1, characterized in that the outlet communicating with the first container for the medium from the third container comprises a device for separating out metal particles possibly carried along with the said medium.

5. A device as claimed in claim 1, characterized in that a duct communicating with the second container opens into the first container, medium from the said second container flowing through said duct into the first container, said medium reacting chemically with the metal particles present.

6. A device as claimed in claim 1, characterized in that a substance is present in the outlet which has a gettering action for the metal particles present.

7. A device as claimed in claim 1 constructed as a hot-gas engine the heater of which is constructed as a pipe heater, characterized in that a circulation duct is provided in which a metal or mixture of metals, for example, NaK, circulates, the heater pipes of the motor being bathed by the said liquid metal or mixture of metals and said metal or mixture of metals being in heat exchanging relationship with the liquid in the first container at another place.

8. A device as claimed in claim 1 which comprises an expansion turbine the outlet of which for expanded medium communicates with the inlet of a compression device through a heat exchanger, the outlet of the compression device communicating through a heater with the inlet of the turbine, characterized in that the working medium of said device is a rare gas, for example, helium, the duct communicating with the outlet of the compression device opening at its other end at a low point into the first container containing metal and a mixture of metals respectively, the outlet of said container communicating with the inlet of the expansion turbine, whereas the duct communicating with the second container communicates at its other end with the circuit through which the working medium flows at a point which, viewed in the direction of flow of the working medium, succeeds the cooler particularly at a point located between the cooler and the inlet of the compression device.

References Cited

UNITED STATES PATENTS

| 3,070,536 | 12/1962 | Taylor et al. | 122—32 X |
|---|---|---|---|
| 3,080,706 | 3/1963 | Flynn et al. | 60—24 |
| 3,325,318 | 6/1967 | Pauliukonis | 149—109 |
| 3,324,652 | 6/1967 | Maillet | 60—36 |
| 3,353,349 | 11/1967 | Percival | 60—24 X |

MARTIN P. SCHWADRON, *Primary Examiner.*

C. B. DORITY, *Assistant Examiner.*

UNITED STATES PATENT OFFICE
CERTIFICATE OF CORRECTION

Patent No. 3,413,801  December 3, 1968

Roelf Jan Meijer et al.

It is certified that error appears in the above identified patent and that said Letters Patent are hereby corrected as shown below:

Column 1, line 22, "dimnishing" should read -- diminishing --. Column 4, line 26, "a piston 2 and a displacer 3 reciprocate. The piston" should read -- the heater system is formed by a container con- --. Column 6, line 18, "tthe" should read -- the --; line 19, "to" should read -- in --.

Signed and sealed this 17th day of March 1970.

(SEAL)
Attest:

Edward M. Fletcher, Jr.
Attesting Officer

WILLIAM E. SCHUYLER, JR.
Commissioner of Patents